United States Patent Office 3,365,656
Patented Jan. 23, 1968

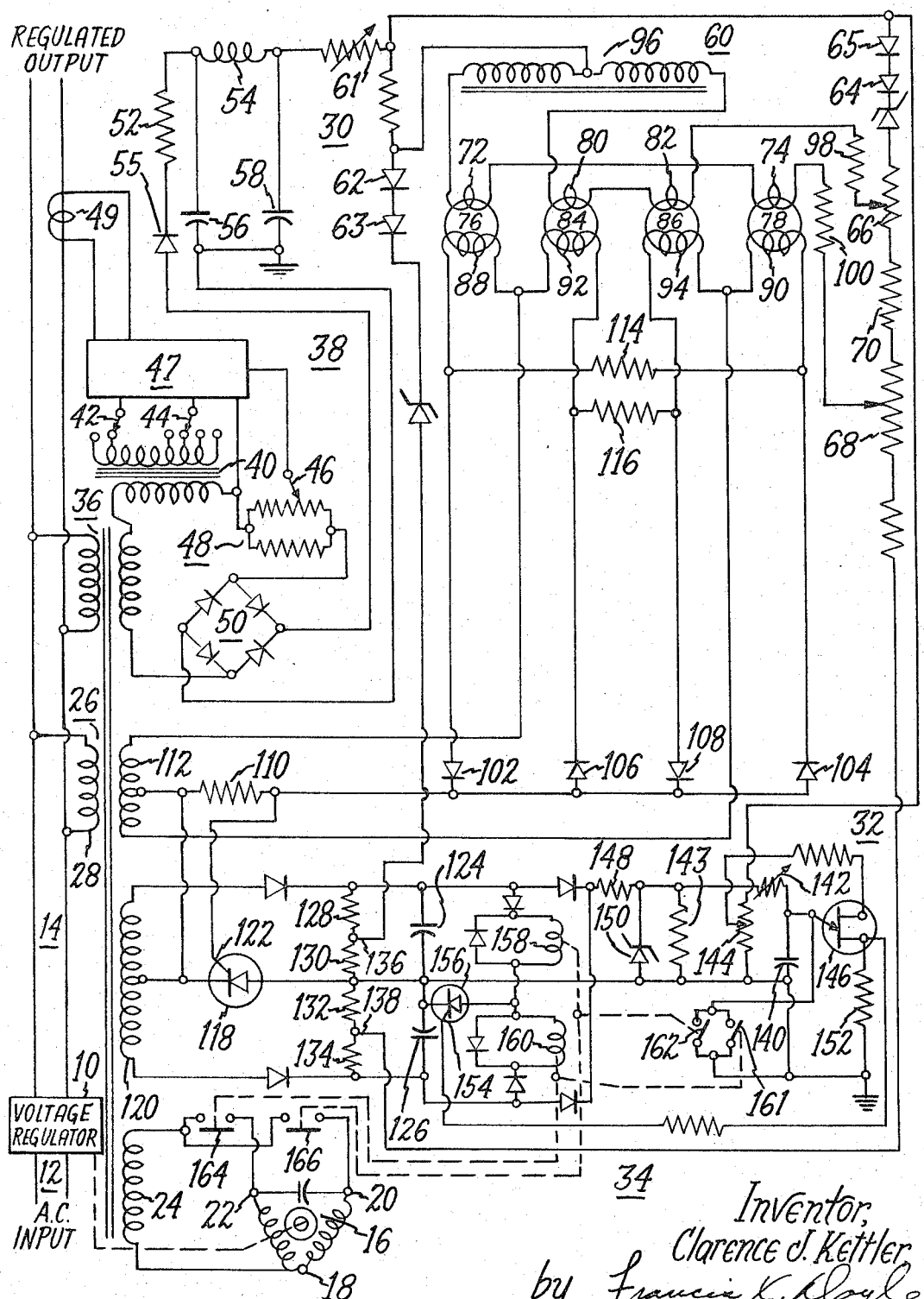

3,365,656
STATIC CONTROL CIRCUIT FOR REGULATORS
Clarence J. Kettler, Stockbridge, Mass., assignor to General Electric Company, a corporation of New York
Filed Nov. 30, 1965, Ser. No. 510,503
6 Claims. (Cl. 323—43.5)

This invention relates to control circuits and more particularly to a static control circuit for electric regulators.

As is well known to those skilled in the electric regulator art, many types of regulators are controlled by electromechanical circuits which sense the changes in a regulated voltage and operate the regulator to return the regulated voltage to the desired level. Static control means have long been considered a desirable replacement for electromechanical means since they dispense with delicately-balanced moving parts, or arcing contacts, which are sensitive to ambient temperatures and atmospheres, and which often require expensive maintenance.

Static controls of numerous types have been applied to electric regulators. However, in many circumstances these static controls are of much greater cost than comparable electromagnetic circuits and therefore have not been considered as desirable economically by customers who might be asked to cover this added cost in the selling price of a regulator. This has hampered the extended application of the static features to all regulator controls.

It is, therefor, a principal object of this invention to provide a low-cost, static control circuit made up of several different solid state devices and a particular form of magnetic amplifier, which may be applied to all types of regulators.

A further object of this invention is to provide a static control circuit for electric regulators which may be used on any type of present-day regulator to eliminate the need for electromechanical controls.

It is a further object of this invention to establish a combination of solid state devices and a particular form of magnetic amplifier wherein the characteristic behaviors of each device are so effectively interrelated as to achieve stable control action with a minimum number of these parts and thereby resulting in a low-cost package.

In carrying out this invention in one form, the static control circuit consists of an error sensing bridge having two separately adjustable nulls for setting bandwidth or dead-band; a combination error signal amplifier and phase selective pulse generator; a silicon controlled rectifier to energize one or the other of two timer voltage sources; an adjustable timing delay circuit to inhibit corrective action for transient or short-time deviations from the desired regulated line level; a time-out sensor to energize one of two motor control relays, and extra contacts on said relays to insure immediate and complete discharge of the timing delay circuit after time out.

The invention which it is desired to protect will be particularly pointed out and distinctly claimed in the claims appended hereto. However, it is believed that this invention and the manner in which its various objects and advantages are obtained, as well as other objects and advantages thereof, will be better understood from the following detailed description of a preferred embodiment thereof, particularly when taken in connection with the accompanying drawing, wherein the single figure illustrates diagrammatically a complete static control circuit according to a preferred embodiment of this invention.

Referring now to the drawing, there is shown a voltage regulator device 10 connected between an unregulated supply circuit 12 and a regulated output circuit 14. Regulator 10 may be any type of reversible regulator, such a transformer regulator of the induction type, or a sliding brush type regulator, or a load tap changing type of regulator. For purposes of illustration, regulator 10 is shown as being driven by a reversible servo-motor 16. Motor 16 may be of any desired type, the presently preferred form being shown as an induction motor of the capacitor split-phase type having a common terminal 18. The forward and reverse rotations of motor 16 are determined by the energization of the terminals 20 and 22. A source of current for motor 16 is shown as provided by secondary winding 24 on a supply transformer 26. As is shown, supply transformer 26 has its primary 28 connected across the regulated output 14.

The static control system of this invention may be considered as consisting of three basic parts. These parts are the error sensing and bandwidth control circuit 30, a dual half-wave, phase differentially oriented, saturable core amplifier circuit 32, and a phase sensitive solid state switching circuit and time delay 34.

The error sensing and bandwidth control circuit 30 comprises a step down transformer 36 and a line drop compensator 38 having reactor 40 with switching means 42, 44, potentiometer 46 with variable trimmer resistor 48, and switching means 47 to provide reversal of current flows in the tapped primary of reactor 40 and the portion of the potentiometer 46 included between the variable tap and reactor 40. As can be seen, transformer 36 is supplied from the regulated output 14, while compensator 38 is supplied a load current replica through series output connected current transformer 49. However, since the line drop compensation elements 40 and 46 are in series connection following the step down of the output voltage through transformer 36, they may be scaled down accordingly, thus reducing the size and cost of reactor 40. Potentiometer 46 and reactor 40 supply in phase and quadrature phase voltages representative of a line drop due to load current and hence effect a load correction of the regulated voltage so that the output voltage is stabilized at some distant load center as is well known in the art.

The corrected voltage signal is rectified by a bridge rectifier 50 and filtered through resistor 52, reactor 54, diode 55, and capacitors 56, 58. The corrected and rectified signal is then fed to the zener bridge 60 through level adjusting rheostat 61. Bridge 60 is shown as having temperature compensation in the form of forward conducting diodes 62, 63, and 64, 65. Additional compensation for copper resistance changes in reactors 40 and 54 is provided by the forward conducting diode 55. The output of bridge 60 provides two nulls which are separately adjustable by means of potentiometers 66 and 68. These potentiometers are adjustable in opposite directions to provide the desired bandwidth control. Resistor 70 is provided to give the minimum desired bandwidth.

The null currents of bridge 60 are routed separately to the control windings 72, 74 of one pair of saturable cores 76, 78 and the control windings 80, 82 of a second pair of saturable cores 84, 86 of saturable core amplifier 32. Cores 76, 78 and 84, 86 are also provided with gate windings 88, 90 and 92, 94 respectively. The operation of these magnetic amplifiers using a common control winding is described and claimed in application Ser. No. 285,440, now U.S. Patent 3,275,928, filed June 4, 1963 for Control Circuit in the name of the present inventor and assigned to the same assignee as this invention. As can be seen, reactor 96 and resistors 98 and 100 serve to suppress current pulse feedbacks into bridge 60 as the four cores, 76, 78 and 84, 86 are caused to fire during the course of each excitation voltage wave excursion. To permit these feedback voltages to impinge on bridge 60 would seriously upset the steady state null currents from the bridge and thereby reduce the error sensitivity.

The dual half-wave, phase differentially oriented, saturable core amplifier 32 will be briefly described. As above noted, amplifier circuit 32 comprises a first pair of cores 76, 78 having control windings 72, 74 and gate windings 88, 90. A second pair of cores 84, 86 have control windings 80, 82 and gate windings 92, 94. Separate half wave or diode rectifiers 102, 104, 106 and 108, are arranged in series with each gate winding and so polarized with respect to the instantaneous excitation voltages from centertapped transformer secondary winding 112 that cores 76, 78 fire or saturate in the course of one half cycle of excitation voltage while cores 84, 86 fire or saturate in the course of the opposite half-cycle of the excitation voltage. The two core pairs behave as separate half wave amplifiers where a gate current that flows during the firing cycle is determined by the amount of total reset current that has reacted on a core during the prior reset half cycle. Since the series diodes for each core pair are oppositely polarized with respect to the excitation voltage from winding 112, these core pairs, in combination with their windings, behave as independent, differentially phase oriented, half wave amplifiers with one pair undergoing a core reset interval while the other pair is functioning in its signal output or firing interval. The gating rectifier diodes that afford this magnetic amplifier action are 102, 104, 106 and 108 which are in series connection with gate windings 88, 90, 92 and 94, respectively. The opposite ends of rectifiers 102, 104, 106 and 108 are connected to a common output or load resistance 110. The opposite terminal of resistance 110 is returned to the center tap of transformer secondary 112 so that all four gate circuits of amplifier 32 are continuously energized. Thus, gate windings 88 and 90 are connected in series across secondary 112 through retifiers 102 and 104 similarly poled and in series. In a similar manner gate windings 92 and 94 are connected in series across winding 112 through rectifiers 106 and 108 similarly poled and in series but with their polarities reversed with respect to rectifiers 102 and 104.

Reset resistors, such as 114 and 116, are provided connected respectively across rectifiers 102, 104 and 106, 108. These reset resistors permit a certain amount of current to flow in the gate windings in the direction blocked by the rectifiers. This current flow is provided to partially reset the magnetization of the cores 76, 78 and 84, 86 and thereby control and precondition their firing angle.

The operation of the error sensing and bandwidth control circuit 30 and the dual half-wave, saturable core amplifier circuit 32 will now be briefly described. With the output voltage 14 at or near normal, the error bridge 60 is functioning at or near one of its two nulls. At one band edge, one null will be established and no steady state current will flow out of that null point into its interconnected pair of amplifier 32 control windings. The other null point cannot be at balance simultaneously so there will be a current flow from this alternate null point into its interconnected pair of amplifiers 32 control windings. However, since the bridge voltage balance was established as being somewhere between the two nulls, this current at the alternate null point will be flowing in opposite polarity from that which would occur if the bridge balance voltage was at some level beyond the range set by the limits of the two nulls. This is so because though the particular amplifier core pair will respond to the flow of control current and establish a pulse voltage across resistance 110, this pulse voltage will produce no action, since its polarity will be opposite to that afforded by a true error signal. Obviously, the same action can be described at the other band edge with similar blocked response from the alternate amplifier pair. At some bridge balance point between the two nulls each amplifier pair will be responding with pulse output voltages across resistance 110, each supplying a pulse signal on alternate half-cycles but of such polarity as to be ineffective. Now when a true voltage error occurs, as evidenced by a bridge balance voltage that exceeds either band limit, the proper amplifier pair will witness a reversal of its control current. This will reverse the polarity of the pulse response from that amplifier pair. The resulting gate current appears as a pulse voltage across resistance 110 of such polarity as to trigger further action and of such time phase relationship as to indicate whether the output voltage 14 is registering above or below its normal level.

This error sensing action may be better understood by describing the action of just one amplifier pair consisting of cores 76, 78 with gate windings 88, 90 and control windings 72, 74; excitation transformer winding 112, output load resistance 110, diode gating rectifiers 102, 104 and core reset resistor 114. Let us assume that the core pair have closely matched magnetic characteristics, and that the control windings and gate windings are each matched to its companion and that the transformer center tap is true. Then regardless of the amount of core reset established by bleeder resistance 114, the cores will respond equally to this reset and thereby fire simultaneously during the subsequent forward conduction half cycle. Under these conditions the gate current will rise sharply during the forward half cycle and be limited only by the resistance of the series loop. It is significant that resistance 110 takes no part in this action and registers no voltage pulse. However, should the circuit elements not be balanced, or if a minute control current were to flow through windings 72, 74 as they are shown polarized with respect to their respective gate windings 88, 90 the reset action on one of the cores will be advanced while the other is retarded. Then on the forward conduction half-cycle, the latter core will fire first with the current path completed through resistance 110. A short interval later the other core also saturates. This sharply terminates the current flow through resistance 110 and the outer series connection carries the bulk of the current for the remainder of the conduction interval. Returning to the assumption of balance components, the magnitude and direction of the control current will establish which core is advanced in reset and which is retarded and to what degree. This in turn determines which core fires first during the conduction interval and hence the polarity of the voltage spike appearing across resistance 110. Reset resistance 114, and its companion 116 in the alternate amplifier pair are so scaled as to afford an approximate 90 degree conduction interval for all gate windings under balanced conditions and nominal excitation levels. This causes the core firing to occur when the excitation cycle is at maximum voltage so that the signal across resistance 110 will also be at a maximum.

By this action of a saturable core amplifier, the resistance 110 carries only a differential gate current. The bulk of the gate current, which transmits no intelligence, is bypassed, thereby affording an unusually high power gain, in a small package and with negligible ambient temperature sensitivity. Also, the signal voltage across resistance 110 resembles a square wave with an output interval as short as one millisecond and an amplitude principally limited only by the design voltage and resistances of the related series circuit. This affords an ideal and economical signal for direct application to the control gate of a small silicon controlled rectifier, as will be described next.

The gating electrode of silicon controlled rectifier 118 is returned to its cathode electrode in series connection with resistance 110. A voltage appearing across resistance 110 of proper polarity and sufficient magnitude will thereby serve to fire the anode-cathode path of the controlled rectifier. As will be understood, the firing of gates 88, 90 and 92, 94 is displaced 180 degrees because rectifiers 102, 104 are reversed in polarity from rectifiers 106, 108. The gate windings 88, 90 and 92, 94 have a common excitation from the secondary 112 of transformer 26. In a similar manner, properly phased voltage is provided to the solid state switching circuit 34, including silicon controlled rectifier 118, by means of secondary 120 on transformer 26.

From the above it will be apparent that if the regulated voltage 14 varies beyond the band width set by potentiometers 66, 68, an error current from bridge 60 will cause the proper pair of gate windings to fire. This will produce a phase current through resistor 110 of the proper polarity to energize the gate 122 of silicon controlled rectifier 118. The pulse current will also be of the proper phase to cause rectifier 118 to fire only when winding 120 is providing energy of the proper polarity to permit a charge to build up on either capacitor 124 or 126.

Thus a deviation in the regulated line voltage 14 outside the band width causes a charge to be rapidly built up on either capacitor 124 or 126. When the error voltage is corrected or otherwise disappears, even for short intervals, it is important that the charge on either capacitor 124 or 126 be dissipated rapidly. This is accomplished through resistances 128, 130 or 132, 134. These loading resistors serve a dual purpose in that taps are provided at 136 and 138 on resistances 128, 130 and resistances 132, 134 to provide feedback voltages to the sensor bridge 60. These feedback voltages provide a latching or holding effect to the bridge 60 which will sharpen the edges of the band width control.

The charge that appears on capacitor 124 or 126 serves to energize an R-C time delay that will prevent the activating of servomotor 16 if the deviations in the regulated voltage 14 are only of intermittent, transistory character. This time delay includes a timing capacitor 140 which begins to accumulate a charge through variable timing resistance 142. Should an error signal disappear before the timing interval is completed, the source voltage on capacitor 124 or 126 will also disappear, allowing the accumulated charge on capacitor 140 to leak back slowly through the same timing resistance 142 and a resistance 143. Thus we achieve the same integrated (forward and back) timing feature that was offered by the earlier electromechanical timer. Resistance 142 is adjustable to control the rate of charge and discharge and thus the time delay before a unijunction transistor 146 will fire. A resistor 148 and zener diode 150 are provided to stabilize the reference voltage applied to unijunction transistor 146. A potentiometer 144 is provided to compensate for the variation in stand-off ratio to be found in different unijunction transistors.

The time delay ends with the spill over of unijunction transistor 146, and as above noted, this time delay is set by means of adjustable resistor 142. When unijunction transistor 146 spills over, it dumps a major part of the charge on capacitor 140 as a current through resistor 152. The resultant voltage drop is applied to gate 154 of silicon controlled rectifier 156, causing the silicon controlled rectifier 156 to conduct and pick up either relay 158 or relay 160. The relay to be picked up or energized will depend on which capacitor, either 124 or 126, is supplying energy at that time. An extra pair of contacts 161, 162 on relays 158, 160 are provided to insure the dissipating of any remaining charge on timing capacitor 140 after a particular motor control relay has been picked up. This is to insure that the time delay for the next sequence of correction will start with a true zero-time reference. Once a relay is picked up it will remain energized until the regulated voltage is back within the desired bandwidth and silicon controlled rectifier 118 ceases conduction.

As will be apparent, when either relay 158 or 160 is energized its normally open contacts 163 or 164 will be closed. Closing of contacts 163 or 164 will cause operation of servomotor 16 in the proper direction to operate voltage regulator 10 to return the regulated voltage 14 to the set voltage band width.

From the above it will be apparent that by means of this invention there has been provided a static or solid state control circuit for regulators which is of low cost, utilizing relatively simple solid state circuits and which will readily control a regulator to provide a regulator voltage within any desired band width. While the invention has been described in accordance with the patent statutes, setting forth the present preferred embodiment thereof, it will be apparent to those skilled in the art that various changes may be made in various circuits and circuit components without departing from the spirit and scope of the invention as it is defined in the appended claims.

What is claimed as new and which it is desired to secure by Letters Patent of the United States is:

1. A static control circuit for a regulator connected in a supply circuit for providing a regulated output voltage, comprising, in combination, means connected to said output voltage for obtaining an error signal when said output voltage deviates from a regulated band width, said means comprising a zener bridge and a saturable core amplifier for obtaining voltage pulses in conformity to the direction of deviation of said error signal, a solid state switching circuit including a silicon controlled rectifier and a time delay circuit, said voltage pulses energizing the gate of said silicon controlled rectifier causing said rectifier to fire, a pair of capacitors, a charge accumulating on one of said pair of capacitors in accordance with the firing of said silicon controlled rectifier, said time delay circuit including a capacitor and a unijunction transistor, said time delay capacitor charging when said silicon controlled rectifier fires, said time delay capacitor operative to fire said unijunction transistor to thereby cause energization of one of a pair of relays, said energized relay causing operation of said regulator to return said regulated voltage to said desired controlled band width.

2. A static circuit as claimed in claim 1 in which a pair of contacts for said relays are provided in parallel circuit with said unijunction transistor, one of said pair of contacts closing on energization of one of said pair of relays to completely discharge said time delay capacitor.

3. A static control circuit as claimed in claim 1 in which a second silicon controlled rectifier is provided, the gate of said second silicon controlled rectifier connected to be energized on firing of said unijunction transistor, said second silicon controlled rectifier causing energization of one of said pair of relays.

4. A static control circuit for a regulator connected in a supply circuit for providing a regulated output voltage, comprising, in combination, means connected to said output voltage for obtaining an error signal when said output voltage deviates from a regulated band width, said means comprising a zener bridge having two separately adjustable nulls and a saturable core amplifier for obtaining voltage pulses in conformity to the direction of deviation of said error signal, said saturable core amplifier comprising two pair of saturable cores, each said pair of saturable cores having control windings connected to be energized by an output of said zener bridge, said energized control windings providing differential currents to gate windings to provide said voltage pulses, a solid state switching circuit including a silicon controlled rectifier and a time delay circuit, said voltage pulses energizing the gate of said silicon controlled rectifier causing said rectifier to fire, a pair of capacitors, a charge accumulating on one of said pair of capacitors in accordance with the firing of said silicon controlled rectifier, said time delay circuit including a capacitor and a unijunction transistor, said time delay capacitor charging when said silicon controlled rectifier fires, said time delay capacitor operative to fire said unijunction transistor to thereby cause energization of one of a pair of relays, said energized relay closing one of a pair of contacts for operation of said regulator to return said regulated voltage to said desired controlled band width.

5. A static control circuit as claimed in claim 4 in which a second pair of contacts for said relay are provided in parallel circuit with said unijunction transistor, one of said second pair of contacts closing on energization of one of said pair of relays to completely discharge said time delay capacitor.

6. A static control circuit as claimed in claim 4 in which a second silicon controlled rectifier is provided in circuit with said pair of capacitors and said pair of relays, the gate of said second silicon controlled rectifier connected to be energized on firing of said unijunction transistor, said second silicon controlled rectifier energizing one of said pair of relays when said gate of said second silicon controlled rectifier is energized.

References Cited

UNITED STATES PATENTS

| 3,026,470 | 3/1962 | Webb | 323—43.5 |
| 3,275,928 | 9/1966 | Kettler | 323—43.5 |
| 3,312,891 | 4/1967 | McCabe et al. | 323—43.5 |

JOHN F. COUCH, *Primary Examiner.*

WARREN E. RAY, *Assistant Examiner.*